US010266212B2

(12) United States Patent
Overgaard et al.

(10) Patent No.: US 10,266,212 B2
(45) Date of Patent: Apr. 23, 2019

(54) HOOD VENT WATER MANAGEMENT SYSTEM AND HOOD ASSEMBLY

(71) Applicant: FORD GLOBAL TECHNOLOGIES, LLC, Dearborn, MI (US)

(72) Inventors: Neil Lawson Overgaard, Ypsilanti, MI (US); Bryn Arthur Davies, Novi, MI (US); Keith Brown, Riverview, MI (US); Martin Hagen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/447,863

(22) Filed: Mar. 2, 2017

(65) Prior Publication Data

US 2018/0251162 A1  Sep. 6, 2018

(51) Int. Cl.
| | |
|---|---|
| B62D 25/10 | (2006.01) |
| B62D 25/24 | (2006.01) |
| B60R 13/00 | (2006.01) |
| B60R 13/07 | (2006.01) |
| B60K 11/08 | (2006.01) |

(52) U.S. Cl.
CPC .............. *B62D 25/24* (2013.01); *B60K 11/08* (2013.01); *B60R 13/00* (2013.01); *B60R 13/07* (2013.01); *B62D 25/105* (2013.01)

(58) Field of Classification Search
CPC ...... B62D 25/24; B62D 25/105; B62D 25/00; B62D 25/10; B62D 25/12; B60K 11/00; B60K 11/08; B60K 11/085; B60R 13/0892; B60R 13/0838; B60R 13/08
See application file for complete search history.

(56) References Cited

U.S. PATENT DOCUMENTS

| | | | | |
|---|---|---|---|---|
| 3,043,390 A | * | 7/1962 | Lattay .................... | B60K 11/08 123/41.49 |
| 3,249,172 A | * | 5/1966 | De Lorean ............ | B62D 25/12 180/68.3 |
| 4,332,187 A | * | 6/1982 | Imai ........................ | B60H 1/28 296/192 |
| 4,548,166 A | * | 10/1985 | Gest ..................... | F02M 35/024 123/198 E |

(Continued)

FOREIGN PATENT DOCUMENTS

| | | |
|---|---|---|
| DE | 4123947 A1 | 1/1993 |
| EP | 0419313 B1 | 11/1992 |

(Continued)

OTHER PUBLICATIONS

English Machine Translation of DE4123947A1.

(Continued)

*Primary Examiner* — James M Dolak
(74) *Attorney, Agent, or Firm* — Jason Rogers; Vichit Chea; King & Schickli, PLLC

(57) ABSTRACT

A hood assembly includes a hood body and a hood vent water management system. The hood vent water management system includes a hood vent having a mounting bracket including a water collection tray and a first water drain and a hood insulator including a water channel and a second water drain. The hood vent water management system diverts water entering through the hood vent away from an underlying engine compartment component. A related method is also disclosed.

12 Claims, 5 Drawing Sheets

(56) References Cited

U.S. PATENT DOCUMENTS

| | | | | |
|---|---|---|---|---|
| 4,646,864 | A * | 3/1987 | Racchi | B60K 11/08 180/69.22 |
| 4,655,496 | A * | 4/1987 | Gahlau | B60R 13/083 181/204 |
| 4,850,444 | A * | 7/1989 | Bojanowski | B60K 11/08 180/68.1 |
| 4,971,172 | A * | 11/1990 | Hoffman | B60K 13/02 180/68.3 |
| 5,042,603 | A * | 8/1991 | Olson | B60K 13/02 180/68.3 |
| 5,275,249 | A * | 1/1994 | Nelson | B62D 25/12 180/68.1 |
| 5,277,656 | A * | 1/1994 | Koukal | B62D 25/12 454/147 |
| 5,558,176 | A | 9/1996 | Petersen et al. | |
| 5,794,733 | A * | 8/1998 | Stosel | B60K 13/02 180/68.1 |
| 5,950,753 | A * | 9/1999 | Muldoon | B60K 11/00 180/68.1 |
| 6,197,403 | B1 | 3/2001 | Brown et al. | |
| 6,514,136 | B1 * | 2/2003 | Hanaya | B60K 15/035 180/68.3 |
| 8,028,782 | B2 * | 10/2011 | Goda | B60R 13/0838 180/68.3 |
| 8,181,728 | B2 * | 5/2012 | Hartland | B60K 11/08 180/68.1 |
| 9,211,791 | B2 | 12/2015 | Laakso et al. | |
| 9,744,921 | B2 * | 8/2017 | Yamaguchi | B60R 13/0838 |
| 9,764,776 | B2 * | 9/2017 | Vigil | B60K 11/08 |
| 9,776,579 | B1 * | 10/2017 | Delaney | B60R 13/07 |
| 9,855,924 | B2 * | 1/2018 | Quintero Perez | B60L 1/003 |
| 9,868,472 | B2 * | 1/2018 | Takada | B60R 21/34 |
| 9,890,791 | B2 * | 2/2018 | Innocenti | B60K 11/00 |
| 9,926,022 | B1 * | 3/2018 | Golembeski | B62D 35/02 |
| 2005/0217625 | A1 | 10/2005 | Niaken et al. | |
| 2006/0201727 | A1 * | 9/2006 | Chan | B62D 25/105 180/69.25 |
| 2010/0066127 | A1 | 3/2010 | Goda et al. | |

FOREIGN PATENT DOCUMENTS

| | | |
|---|---|---|
| EP | 0694426 B1 | 6/1999 |
| JP | H02158419 A | 6/1990 |
| JP | H10324267 A | 12/1998 |
| JP | 2014205412 A | 10/2014 |
| WO | WO2013174662 A1 | 11/2013 |

OTHER PUBLICATIONS

English Machine Translation of EP0419313B1.
English Machine Translation of JP2014205412A.
English Machine Translation of JPH02158419A.
English Machine Translation of JPH10324267A.
Edgar, Julian; "Building and Testing an Airbox"; AutoSpeed; http://www.autospeed.com/cms/article.html?&title=Building-and-Testing-an-Airbox&A=113248; Feb. 9, 2016; pp. 1-10; Issue 715.

* cited by examiner

HOOD VENT WATER MANAGEMENT SYSTEM AND HOOD ASSEMBLY

TECHNICAL FIELD

This document relates generally to the motor vehicle equipment field and, more particularly, to a hood vent water management system, a hood assembly and to a method of managing water entering through a hood vent.

BACKGROUND

Some hood assemblies incorporate hood vents to allow air to flow from the hot engine compartment into the ambient environment outside the vehicle. Since these hood vents are designed to provide a path for air flow, there is the potential for water to flow from the outside of the vehicle through the hood vents into the engine compartment. That water may take many forms including, for example, rain, melting ice and snow, car wash water or even condensation. Water entering an engine compartment must be managed or diverted in order to prevent flow onto or into engine compartment components not designed to accept water.

This document relates to a new and improved hood vent water management system as well as to a hood assembly incorporating that hood vent water management system. Further, this document relates to a new and improved method of managing water entering through a hood vent.

SUMMARY

In accordance with the purposes and benefits described herein, a hood vent water management system is provided. That hood vent water management system comprises a hood vent and a hood insulator. The hood vent has a mounting bracket including a water collection tray and a first water drain. The hood insulator includes a water channel and a second water drain whereby water entering through the hood vent is directed away from an underlying engine compartment component. More specifically, the water channel may be oriented to receive the water from the first water drain and deliver the water to the second water drain.

The hood vent may also include a cover and an isolator underlying the cover. That isolator may include a water discharge port feeding the water into the water collection tray. The cover may include a grille held in a perimeter flange.

In accordance with an additional aspect, a hood assembly is provided. That hood assembly comprises a hood body and a hood vent water management system including a hood vent and a hood insulator.

The hood vent is held in the hood body. The hood vent includes a mounting bracket securing the hood vent to the hood body. The mounting bracket includes a water collection tray and a first water drain. The hood insulator includes a water channel and a second water drain. Water entering through the hood vent is directed away from an underlying engine compartment component by this hood vent water management system.

More specifically, the water channel may be oriented to underlie the first water drain and deliver water from the first water drain to the second water drain. The hood vent may include a cover and an isolator underlying the cover. The isolator may include a water discharge port feeding the water into the water collection tray. The cover may include a grille held in a perimeter flange.

The hood body may include an inner hood panel and an outer hood panel. The inner hood panel and the outer hood panel may be captured between the hood vent and the mounting bracket.

In accordance with an additional aspect, a method is provided of managing water entering through a hood vent. That method comprises the steps of: (a) collecting the water in a water collection tray of the hood vent, (b) delivering the water, through a first water drain of the hood vent, to a water channel of a hood insulator and (c) discharging the water from a second water drain in the hood insulator.

The method may further include the step of directing the water away from an underlying engine compartment component when discharging the water from the second water drain. Still further, the method may include collecting the water in an isolator of the hood vent before collecting the water in the water collection tray. Still further, the method may include discharging the water from the isolator into the water collection tray.

In the following description, there are shown and described several preferred embodiments of the hood vent water management system, a hood assembly incorporating the hood vent water management system and the related method of managing water entering through a hood vent. As it should be realized, the hood vent water management system, hood assembly and method are capable of other, different embodiments and their several details are capable of modification in various, obvious aspects all without departing from the hood vent water management system, hood assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood vent water management system, hood assembly and related method and together with the description serve to explain certain principles thereof.

Reference will now be made in detail to the present preferred embodiments of the hood vent water management system and hood assembly, examples of which are illustrated in the accompanying drawing figures.

DETAILED DESCRIPTION

Figure 1:
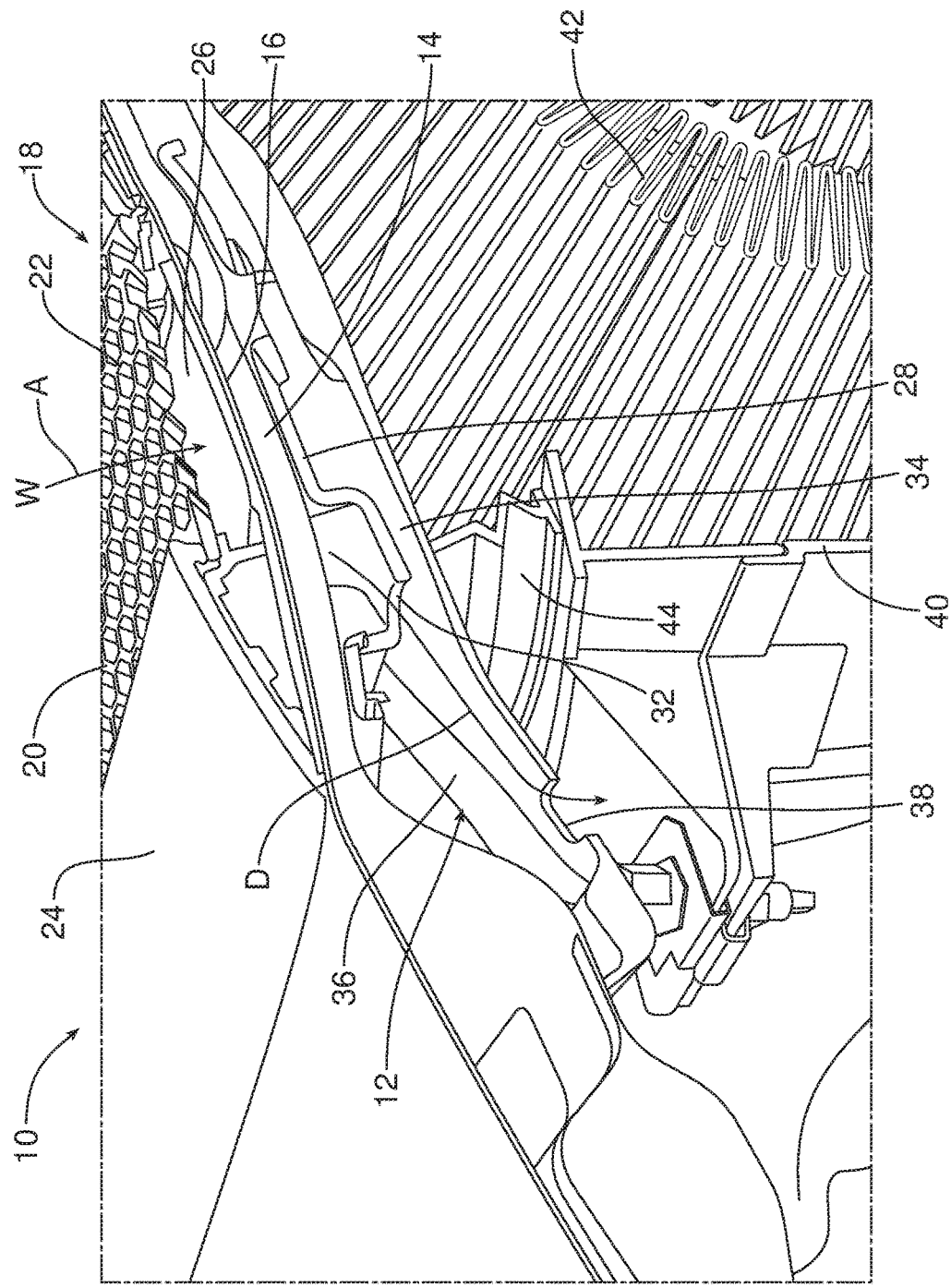
FIG. 1 is a cross-sectional view of the hood assembly and hood vent water management system.

Reference is now made to FIG. 1 illustrating a hood assembly 10 incorporating a new and improved hood vent water management system, generally designated by reference numeral 12.

The hood assembly 10 includes a hood body comprising an inner hood panel 14 and an outer hood panel 16. The inner hood panel 14 and outer hood panel 16 may be made from any appropriate material including, for example, sheet metal material.

The hood vent water management system 12 includes a hood vent 18 comprising a cover 20 including a grille 22 held in a perimeter flange 24. See also FIG. 2.

The hood vent 18 also includes an isolator 26 that underlies the cover 20. See also FIG. 3.

Still further, the hood vent 18 includes a mounting bracket 28 that underlies the isolator 26. The mounting bracket 28 includes a water collection tray 30 and a first water drain 32. See also FIG. 5.

The hood vent 18 is secured to the inner hood panel 14 and outer hood panel 16 of the hood body by means of capturing the inner hood panel and outer hood panel between (a) the cover 20 and isolator 26 outboard the outer hood panel 16 and (b) the mounting bracket 28 outboard the inner hood panel 14. Fasteners (not shown) connect the cover 20 to the mounting bracket 28 and secure the hood vent 18 in position in the inner hood panel 14 and the outer hood panel 16.

Figure 5:
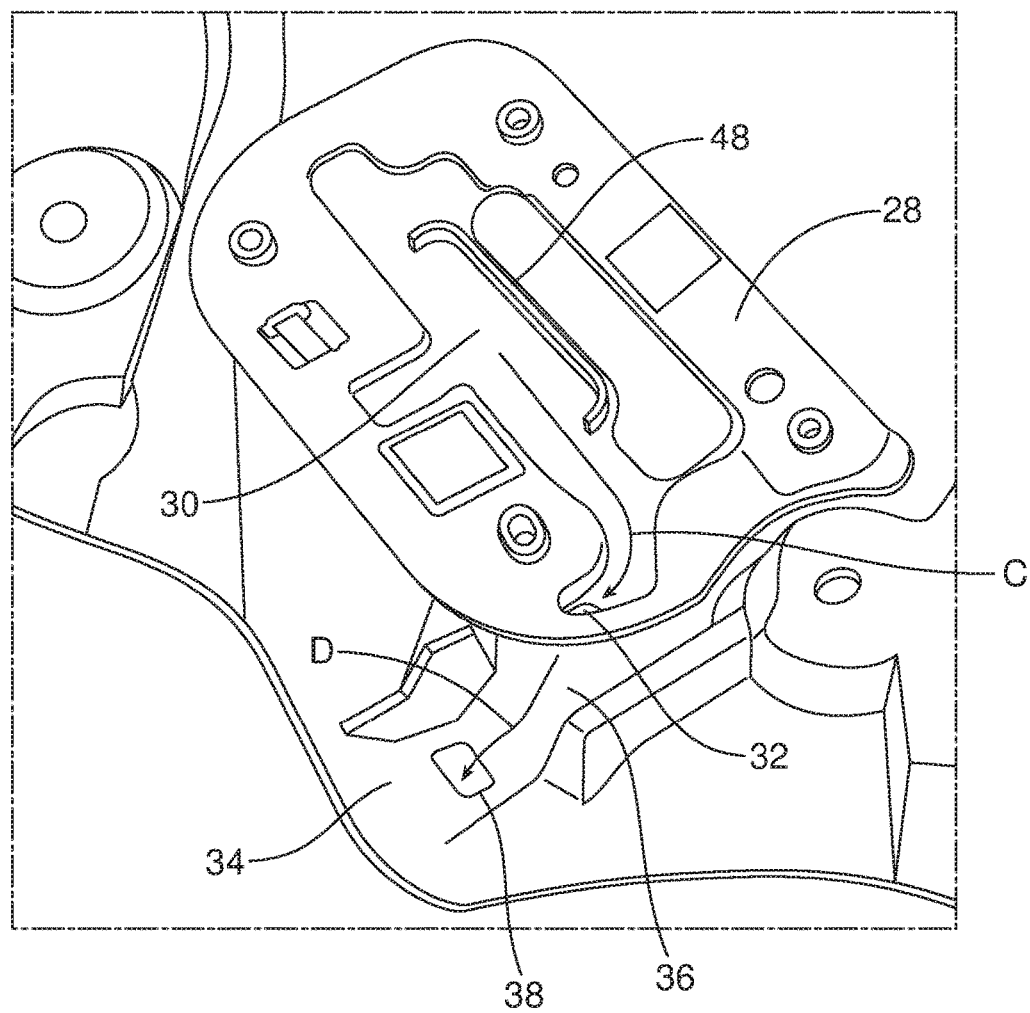
FIG. 5 is a perspective view illustrating how the water flows from the water collection tray in the mounting bracket through a first water drain onto the underlying hood insulator where it is directed by a water channel to a second water drain.

As best illustrated in FIGS. 1 and 5, the hood vent water management system 12 also includes a hood insulator 34. The hood insulator 34 may be made from any appropriate material including, for example, a core made from a foam insulating material or a fiberglass insulating material of a type known in the art enveloped in a cloth scrim.

The hood insulator 34 may be molded to shape. In the illustrated embodiment the hood insulator 34 includes a water channel 36 and a second water drain 38.

As illustrated in FIGS. 1-5, the hood vent water management system 12 functions to divert water W entering through the grille 22 of the hood vent 18 (note action arrows A in FIGS. 2 and 5) away from an underlying engine compartment component such as the induction air box 40 and air cleaner 42 illustrated in FIG. 1. As shown, that induction air box 40 includes an open top that seals against the hood insulator 34 by means of the continuous flexible seal 44 along the top edge of the induction air box.

Figure 2:
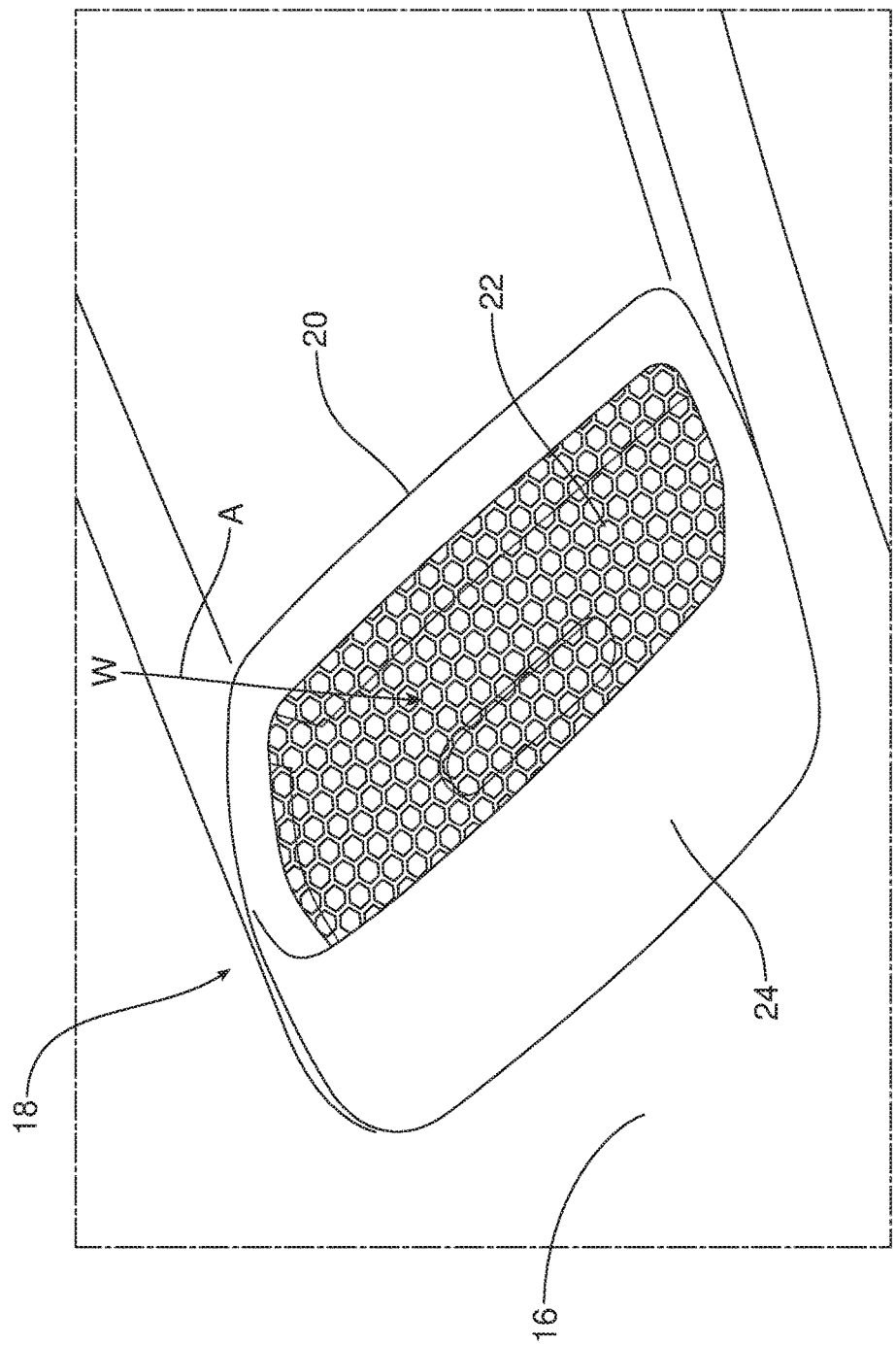
FIG. 2 is a detailed top perspective view showing how water may enter through the grille of the hood vent in the outer hood panel of the hood assembly.
Figure 3:
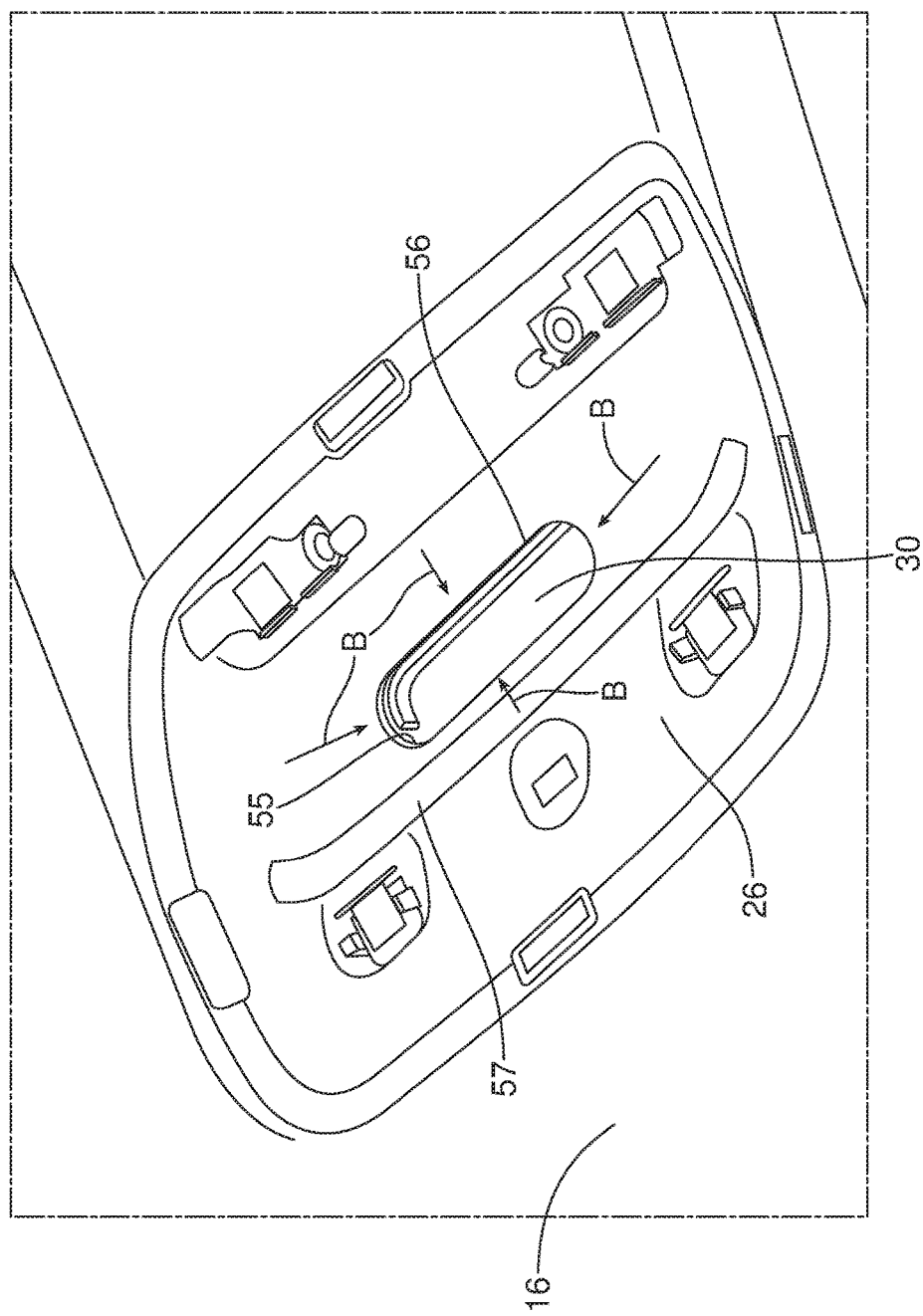
FIG. 3 illustrates how the water entering in FIG. 2 is collected in the isolator of the hood vent and discharged into the water collection tray of the hood vent mounting bracket.

As best illustrated in FIGS. 2 and 3, water W entering through the grille 22 is collected on the upper surface of the isolator 26 which is contoured to direct that water toward the water discharge port 56. Note action arrows B in FIG. 3. As shown, the water is fed by the water discharge port 56 through an opening 55 in the outer hood panel 16 and the inner hood panel 14 into the underlying water collection tray 30 of the mounting bracket 28. Note particularly FIGS. 3-5. The upper surface of the isolator 26 may include one or more raised water guide features 57 to help direct the flow of water toward the water discharge port 56.

As illustrated in FIG. 5, the upper surface of the mounting bracket 28 includes a berm 48. Together, the berm 48 and the contour of the water collection tray 30 tends to direct the water as illustrated by action arrow C toward the first water drain 32. As best illustrated in FIGS. 1 and 5, the water passing through the first water drain 32 is received by the aligned, underlying water channel 36 formed in the upper surface of the hood insulator 34. The water channel 36 directs the water (note action arrow D) along the upper surface of the hood insulator 34 to the second water drain 38. That second water drain 38 directs the water away from the underlying engine compartment component/air induction box 40 so as to prevent that water from entering the air induction box and being drawn into the engine.

Figure 4:
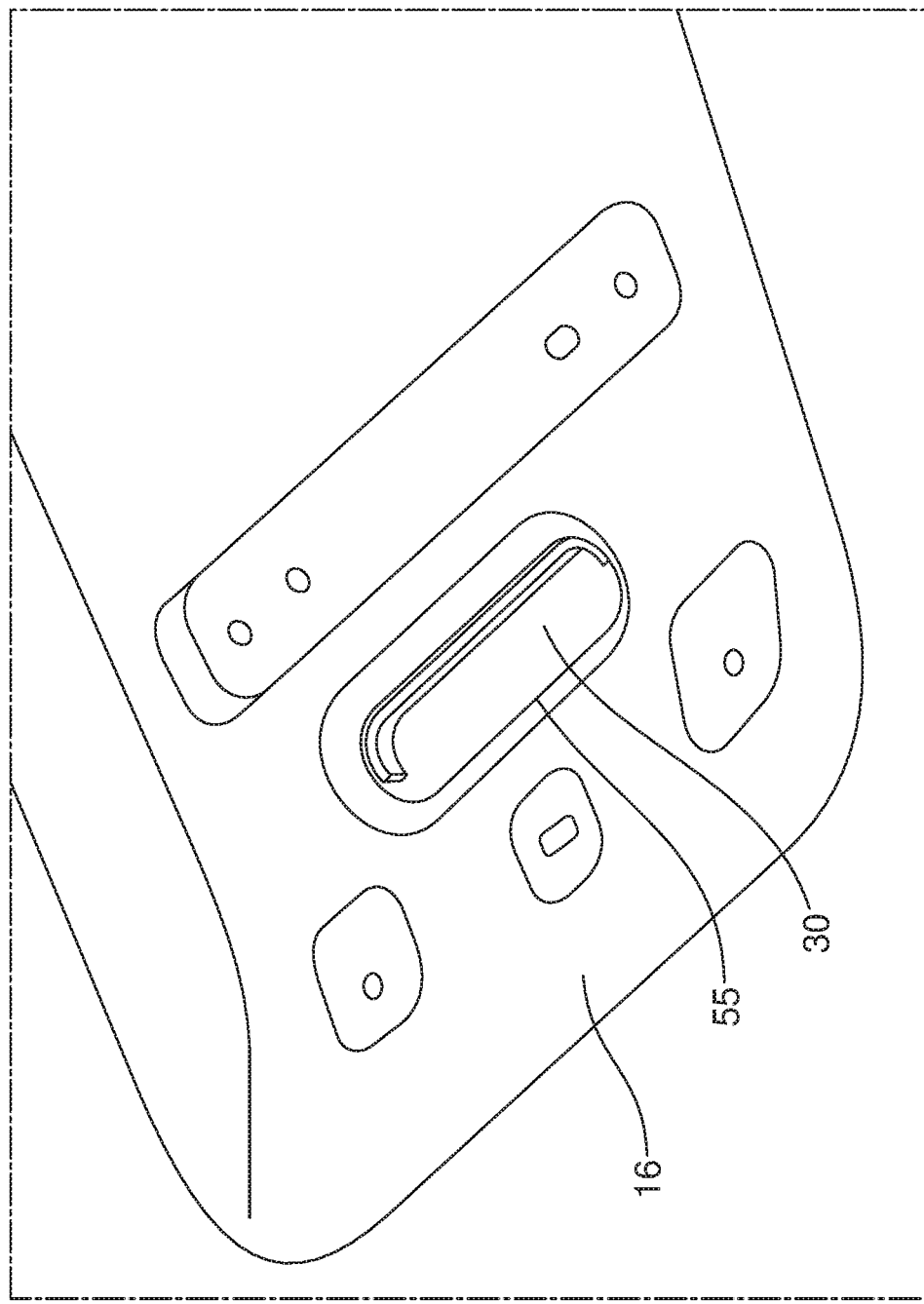
FIG. 4 is a view similar to FIG. 3 but with the isolator removed.

As should be appreciated from the above description, the hood vent water management system 12 may be characterized by a method of managing water entering through the hood vent 18. That method may be described as comprising the step of collecting water passing through the grille 22 of the hood vent 18 in a cavity of the isolator 26 as illustrated in FIGS. 1-3. This is followed by the discharging of the water from the isolator 26 through the water discharge port 56 into the water collection tray 30 of the mounting bracket 28 as best illustrated in FIGS. 3-5.

The method further includes the step of collecting the water in the water collection tray 30 and then delivering that water through the first water drain 32 of the hood vent 18 to the water channel 36 formed in the hood insulator 34. The method then also includes the step of discharging the water from the second water drain 38 in the hood insulator 34 and directing that water away from the underlying engine compartment component/induction air box 40 when discharging the water from the second water drain.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hood vent water management system, comprising:
a hood vent having a mounting bracket, wherein the mounting bracket includes a water collection tray and a first water drain whereby the water collection tray directs water toward the first water drain; and
a hood insulator including a water channel and a second water drain whereby said water entering through said hood vent is directed away from an underlying engine compartment component.

2. The hood vent water management system of claim 1, wherein said water channel is oriented to receive said water from said first water drain and deliver said water to said second water drain.

3. The hood vent water management system of claim 2, wherein said hood vent also includes a cover and an isolator underlying said cover.

4. The hood vent water management system of claim 3, wherein said isolator includes a water discharge port feeding said water into said water collection tray.

5. The hood vent water management system of claim 4, wherein said cover includes a grille held in a perimeter flange.

6. A hood assembly, comprising:
a hood body;
a hood vent secured to said hood body, said hood vent including a mounting bracket securing said hood vent to said hood body, said mounting bracket including a water collection tray and a first water drain;
an isolator including at least one raised water guide feature and a water discharge port whereby the at least one raised water guide feature directs water toward the water discharge port; and
a hood insulator including a water channel and a second water drain whereby said water entering through said hood vent is directed away from an underlying engine compartment component.

7. The hood assembly of claim 6, wherein said water channel is oriented to underlie said first water drain and deliver said water from said first water drain to said second water drain.

8. The hood assembly of claim 7, wherein said hood vent includes a cover and said isolator underlies said cover.

9. The hood assembly of claim 8, wherein said water discharge port feeds said water into said water collection tray.

10. The hood assembly of claim 9, wherein said cover includes a grille held in a perimeter flange.

11. The hood assembly of claim 10, wherein said hood body includes an inner hood panel and an outer hood panel.

12. The hood assembly of claim 11, wherein said inner hood panel and said outer hood panel are captured between said hood vent and said mounting bracket.

\* \* \* \* \*